Aug. 21, 1956

W. E. WARD 2,759,583

FLUID OPERATED CLUTCH

Filed Nov. 6, 1952

INVENTOR.
WILLIAM E. WARD
BY Hudson, Boughton,
Williams, David & Hoffmann
ATTORNEYS Aug. 21, 1956     W. E. WARD     2,759,583
FLUID OPERATED CLUTCH Filed Nov. 6, 1952                3 Sheets-Sheet 2

INVENTOR.
WILLIAM E. WARD
BY Hudson Boughton
Williams, David & Hoffmann
ATTORNEYS Aug. 21, 1956    W. E. WARD    2,759,583
FLUID OPERATED CLUTCH
Filed Nov. 6, 1952    3 Sheets-Sheet 3
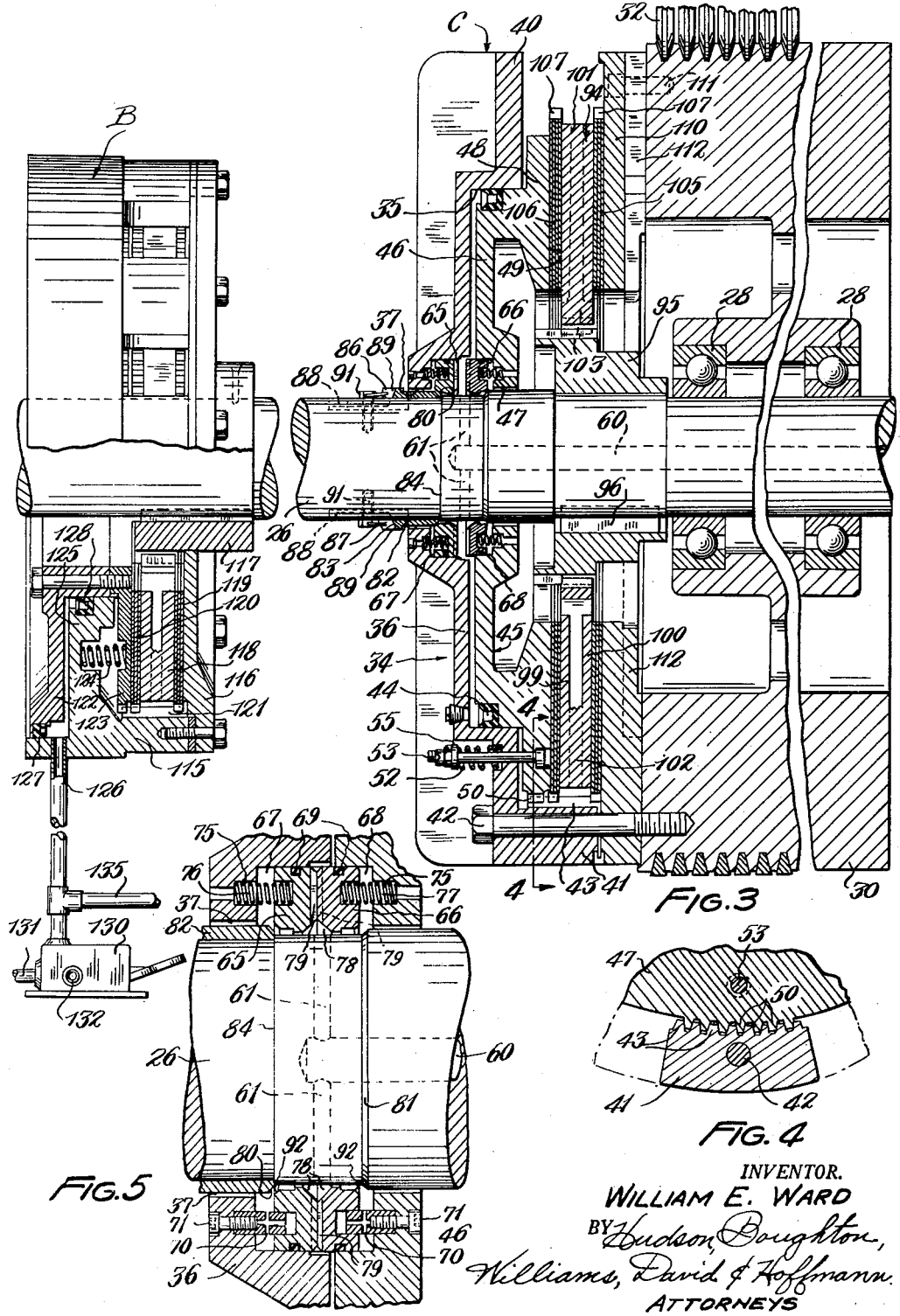
INVENTOR.
WILLIAM E. WARD
BY Hudson Doughton,
Williams, David & Hoffmann.
ATTORNEYS though the piston and valve member 52 are rotatable relative to each other, sliding friction therebetween is obviated because the piston and valve member 52 are rotatable relative to each other.

United States Patent Office 2,759,583
Patented Aug. 21, 1956

2,759,583

FLUID OPERATED CLUTCH

William E. Ward, Shaker Heights, Ohio, assignor to The Cleveland Crane & Engineering Company, Wickliffe, Ohio, a corporation of Ohio Application November 6, 1952, Serial No. 319,137

10 Claims. (Cl. 192—85)

The present invention relates to power presses and the like having a fluid operated clutch to intermittently drivingly connect a shaft for actuating the press with a rotating drive member concentric with the shaft.

The principal object of the invention is the provision of a new and improved power press or the like having a clutch actuated by a cylinder and piston type fluid motor including a fluid chamber structure attached to one of the clutch members and having an opening in one wall through which a shaft connected to the other clutch member extends, and sealing means to prevent the escape of fluid from the chamber between the shaft and chamber wall, said sealing means comprising two annular valve members concentric with the shaft, one of which valve members rotates with the chamber structure and the other of which rotates with the shaft, the valve members having registering annular faces concentric with the shaft and engageable with one another to form a fluid seal when one of the valve members, movable axially of the shaft, engages the other, the movable valve member being normally urged from the other when the clutch is disengaged and moved to closing engagement with the other when fluid is introduced into the chamber for actuating the clutch whereby the fluid sealing valve surfaces are engaged substantially only when the shaft is rotating with chamber structure so that sliding friction between the sealing surfaces is obviated.

Another object of the invention is the provision of a new and improved press of the character referred to in which the fluid motor for actuating the clutch comprises a cylinder and piston concentric with the shaft, the fluid for actuating the piston being supplied through a passage within the shaft which opens into the cylinder between the head thereof and the piston, and the fluid sealing means between the shaft and the piston and cylinder head includes two annular valve members operatively connected with the piston and cylinder respectively, and which valve members are disposed on opposite sides of the fluid passage opening and are independently movable in opposite directions relative to the shaft to engage two spaced annular valve members respectively attached to the shaft and form a fluid seal therebetween, the two movable valve members being normally urged from the valve members on the shaft and having surfaces subjected to fluid pressure entering the cylinder whereby the pressure of the fluid moves the last mentioned valve members into sealing engagement with the respective valve members on the shaft.

A further object of the invention is the provision of a new and improved press of the character referred to in which the cylinder structure of the clutch actuating motor forms a closure for part of the clutch mechanism and is detachable therefrom for access to certain parts of the clutch, one of the annular valve members on the shaft being detachably connected thereto so that it may be moved longitudinally of the shaft to permit detachment and removal of the cylinder and its associated annular valve from the clutch mechanism and along the shaft.

The invention resides in certain details of constructions and combinations and arrangements of parts and further objects and advantages thereof will be apparent to those skilled in the art to which the invention relates from the following description of the preferred embodiment described with reference to the accompanying drawings forming a part of this specification in which similar reference characters designate corresponding parts, and in which, Fig. 1 is a front elevational view of a punch press embodying the invention;

Fig. 3 is a fragmentary sectional view taken substantially along line 3—3 of Fig. 2, but on a larger scale;

Fig. 4 is a fragmentary sectional view taken substantially along line 4—4 of Fig. 3; and Fig. 5 is a fragmentary view, on an enlarged scale, of the mechanism shown in Fig. 3.

Figure 1:
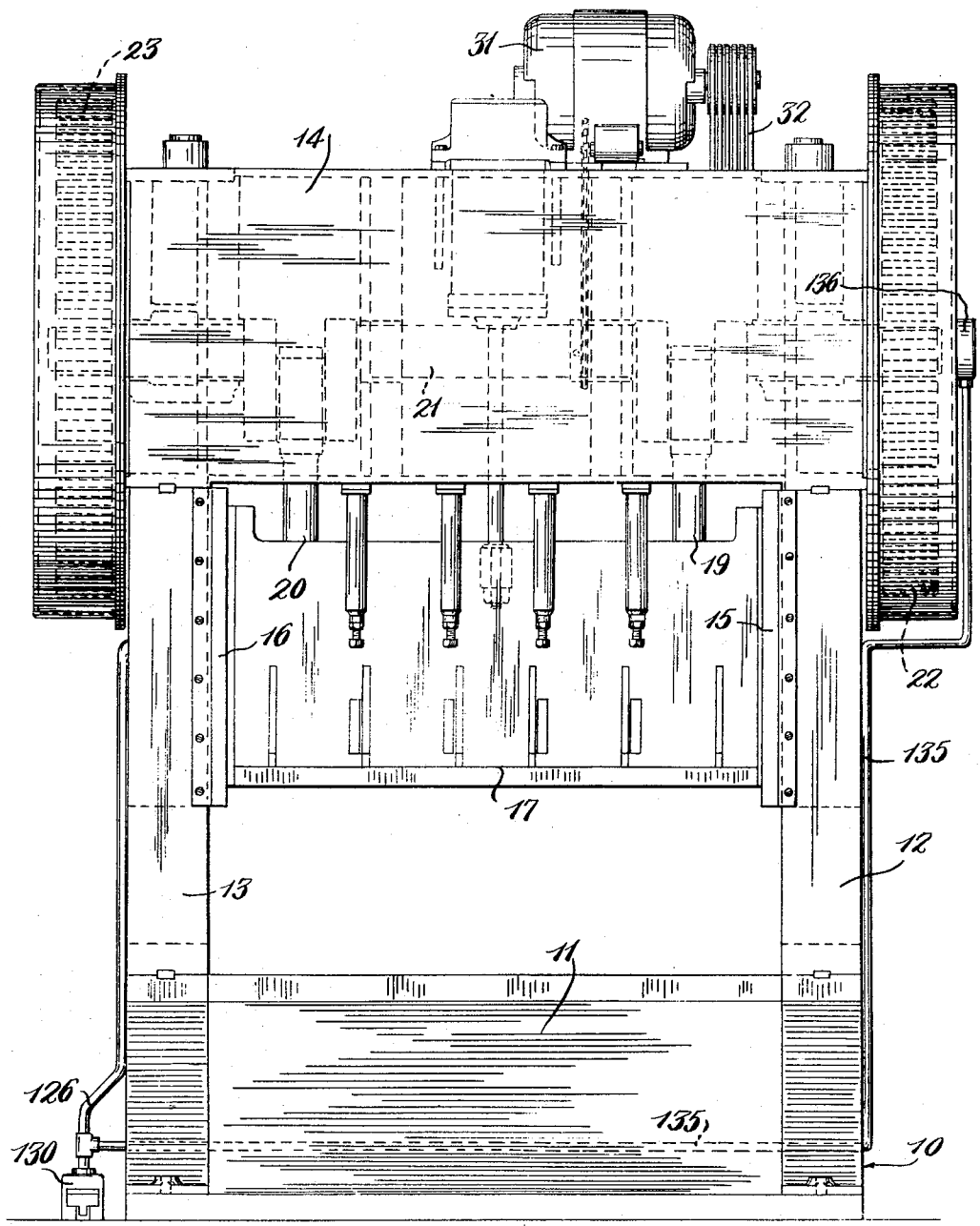
Figure 2:
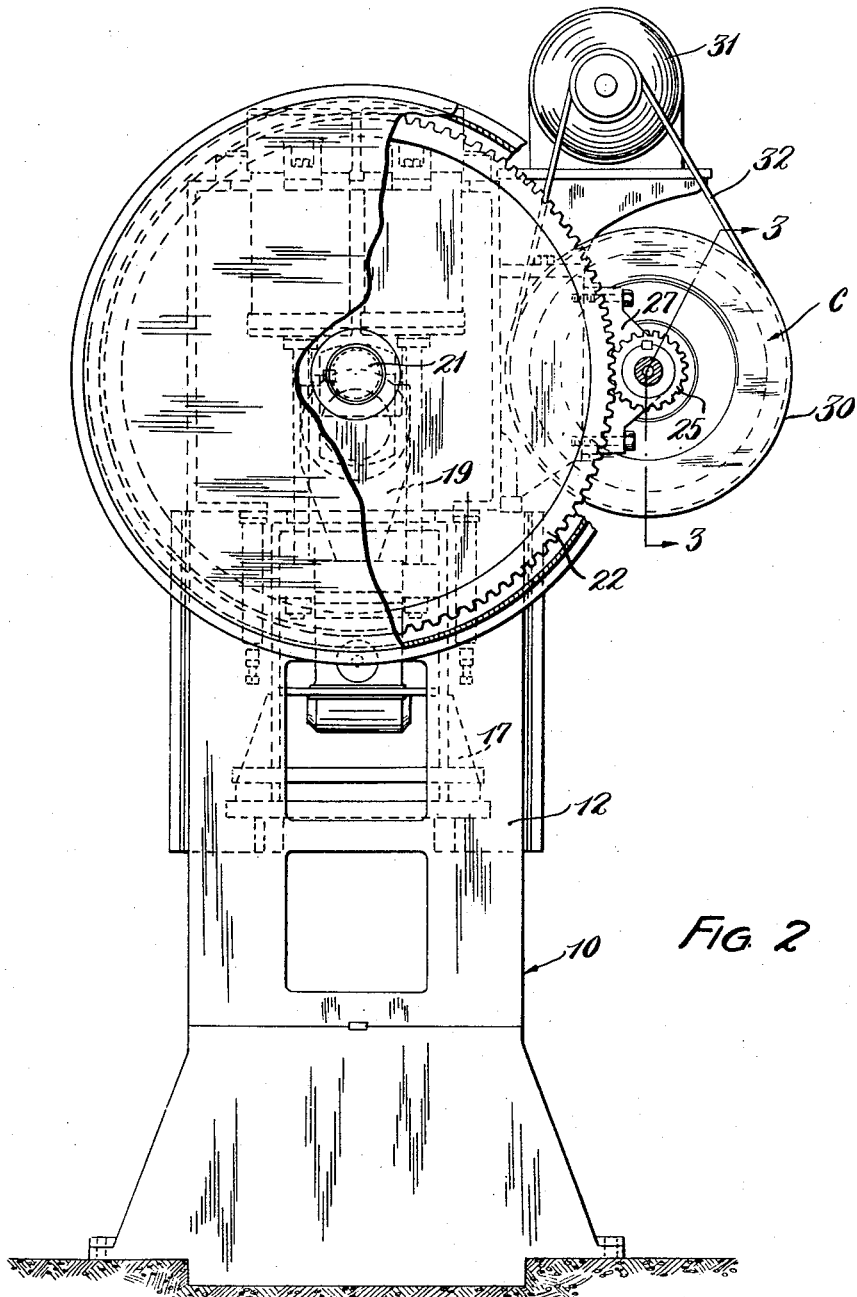
Fig. 2 is a side elevational view of the punch press showing certain parts thereof broken away.

Although the invention can be used in various mechanisms, it is particularly suitable for use in presses having intermittently reciprocable rams or punches, and for the purpose of illustration it is herein shown embodied in a punch press. The punch press comprises a frame 10 including a bed 11 having uprights 12, 13 at opposite sides interconnected by a crown 14 at the tops thereof. The uprights 12, 13 have guideways 15, 16 attached thereto which guide a ram or punch 17 vertically. The ram 17 is reciprocated by pitmans 19, 20 which are attached to the cranks of a shaft 21 journalled in the crown. The crank shaft 21 is driven by two bull gears 22, 23 attached to opposite ends thereof.

The bull gears 22, 23 are driven by pinions 25, only one of which is shown, which pinions are attached to the ends of a drive shaft 26 supported adjacent to its ends by two bearings 27, only one of which is shown, attached to the crown at opposite ends thereof.

The drive shaft 26 carries a flywheel 30 intermediate the bearing 27, which flywheel is journalled thereon, preferably by suitable anti-friction bearings 28, so that the flywheel freely rotates on the shaft. The flywheel is driven by an electric motor 31, supported on the upper part of the press frame, through drive belts 32.

The flywheel 30 is intermittently connected in driving relation with shaft 26 by a fluid clutch indicated generally at C, which clutch comprises a cylinder 34 having a cylindrical piston chamber 35 and an end wall or head 36 which has an axial opening 37 therethrough through which the drive shaft freely extends. The open end of the cylinder 34 has a radial flange 40 which is provided with a plurality of arcuate projections 41 which extend outwardly from the face of the flange and which have openings to receive bolts 42 by which the cylinder is attached to the side of the flywheel 30. The projections 41 are equally spaced about the cylinder and they provide spacers for separating the cylinder proper from the flywheel to permit free circulation of air between the cylinder and flywheel, and in addition, have inwardly facing teeth or splines 43, the purpose of which will appear hereinafter. The cylinder 34 is carried by the flywheel 30 and the diameter of the opening 37 therein through which the shaft 26 extends is such that there is clearance between the shaft and cylinder.

A clutch actuating piston 45 reciprocates in the cylinder chamber 35 and the head end 46 of the piston has an axial opening 47 which receives the shaft 26 with clearance therebetween. The periphery of the head end 46 of the piston is undercut to receive a suitable piston ring 44, which ring may be of any suitable type and is here shown as a flexible ring U-shape in cross section.

The outer end of the piston 45 has an annular ring formation 48 which presents a smooth annular surface 49 lying in a plane normal to the drive shaft 26, the purpose of which will appear as the description proceeds. The periphery of the ring portion 48 has teeth 50 which mesh with the teeth or splines 43 of the cylinder so that the piston is rotated by the cylinder and it can move axially relative to the cylinder.

The piston 45 is normally urged toward the end 36 of the cylinder chamber by a plurality of compression springs 52, only one of which appears in the drawings, which are seated in recesses in the outer end of the cylinder and which surround bolts 53 which extend through openings in the ring portion 48 of the piston and the flange 40 of the cylinder member. The bolt heads are recessed in the ring portion and the outer ends have nuts and washers 55 against which the springs 52 press to urge the bolts outwardly to draw the piston to the left as viewed in Fig. 3.

The piston 45 is forced to the right, as viewed in Fig. 3, to actuate the clutch by fluid pressure, such as air, introduced into the cylinder. In the present form of press, the drive shaft 26 has an axial bore 60 which extends from one end thereof to a point opposite the area between the cylinder head and piston, and radial bores 61 extend into the axial bore to form outlets which open into the cylinder chamber between the head 36 and the end 46 of the piston. In the present form of press, air is introduced into the passage 60 by suitable means, described more fully heerinafter, and the escape of the air from the cylinder between the shaft and the edges of the openings 37 and 47 in the cylinder and piston respectively is prevented by novel, and improved sealing means. The preferred form of sealing means comprises two annular members or rings 65, 66 concentric with the shaft 26 and connected to rotate with the cylinder 34 and piston 45, respectively, and movable longitudinally with respect to the shaft. The rings 65, 66 are preferably of bronze and slidingly fit into cylindrical recesses 67, 68 in the cylinder and piston, the peripheries being grooved to receive suitable packing rings 69 to seal the space between the rings and the walls of the recesses. The annular members 65, 66 are caused to rotate with the cylinder and piston by dowels 70, four of which are provided in the ends of each of the recesses 68, 69 spaced at 90° about the axis of the recesses and secured in bored seats by bolts 71. The dowels 70 project into bored openings 72 in the outer radial faces of the rings, as shown, and cause the rings to rotate with the cylinder and piston while permitting the rings to move axially relative to the shaft 26. Preferably, openings are bored in the dowels, as shown, to permit breathing in openings 72 as the members 65, 66 move axially of the dowels.

The members 65, 66 are each normally urged toward one another by four springs 75 having their ends seating in aligned bores 76, 77 formed in the members and cylinder and piston, which bores are preferably spaced at 90° about the axis of the members. The annular members 65, 66 are normally engaged as shown in Fig. 5 in which position they are over the openings of the bores 61 in the shaft 26. The inner surfaces of the annular members adjacent to the central openings therethrough are sloped as shown at 78 to permit passage of air from the bores 61 into the cylinder and to cause the air to force the rings outwardly. In addition, radial grooves 79 are provided in the inner faces of the annular members to permit passage of the air between the piston and cylinder head. The members 65, 66 have relatively close clearance with the shaft 26 so that the introduction of air between the rings causes them to be forced apart, as shown in Fig. 3.

The shaft 26 has two annular valve surfaces or seats 80, 81 concentric therewith and located outwardly of the rings 65, 66. The valve surface 80 is preferably formed by a sleeve 82 closely fitting the shaft but slidable to the left therealong. The inner end of the sleeve is tapered to form the seat 80 and the outer end has a rim, the outer face of which is tapered to form a camming surface 83. The inner end of the sleeve 82 abuts a shoulder 84 formed on the shaft 26 and the sleeve is held to the shoulder by two cam blocks 86, 87 disposed in recesses 88 in opposite sides of the shaft and having cams 89 which engage the surface 83 and cam the sleeve to the shoulder when the blocks are forced into the recesses by screws 91 threaded into the side of shaft 26 and extending through the cam blocks. By the arrangement shown the sleeve 82 can be moved along the shaft 26 to permit the cylinder 34 to be removed from the flywheel, as described more fully hereinafter, and can be pressed into air tight sealing engagement with the shoulder 84 to prevent passage of air between the shaft and sleeve.

The annular valve surface 81 is formed on the shaft so that it is integral therewith.

The annular members 65, 66 each has an annular valve surface 92 formed thereon which engages the valve surfaces 80, 81 respectively, when the members are moved apart to the positions shown in Fig. 3, and form air tight seals therewith. Since the piston 45 is moved to the right by air pressure in the cylinder to actuate the clutch to drivingly connect the flyheel 30 to the shaft 26, the members 65, 66 will rotate with the valve surfaces 80, 81 during the time they are in sealing engagement therewith. When the clutch is released by exhausting the cylinder chamber 35, the members 65, 66 move from their respective valve seats so that they then rotate freely of the shaft 26 and the sealing surfaces 80, 81. Thus, sliding friction between the sealing surfaces during relative rotation between the cylinder 34, piston 45 and shaft 26 is obviated thereby providing a highly efficient and long lasting seal. In effect, the members 65, 66 are in the nature of movable valve elements which are moved, upon introduction of fluid pressure into the cylinder, from an open position into engagement with valve surfaces 80, 81 of stationary valve elements to prevent the flow of pressure fluid between the valve surfaces 92 of the movable valve elements 65, 66 and the surfaces 80, 81 on the stationary valve element.

The reciprocation of the piston 48 by air pressure in the cylinder actuates suitable clutching members to clutch the flywheel with the shaft 26, and in the form shown, the clutch includes a center clutch plate 94, having a toothed axial opening supported on a splined hub 95 keyed to shaft 26 by key 96. The teeth of the plate 94 mesh with the splines of the hub so that the plate rotates the shaft 26 through the hub and can move axially thereof. The clutch plate 94 is preferably formed of two spaced annular walls 99, 100 which present smooth outer surfaces and which are separated by radial webs 101, 102, alternately spaced about the plate and the webs 101 extending from the hub to the outer edge of the plate and webs 102 extending from the periphery of the plate and terminate approximately mid-way between the periphery and hub of the plate. The plate walls 99, 100 have openings 103 intermediate the webs 101 providing for the circulation of air from the hub of the plate outwardly between the walls and webs 101, 102 to maintain the plate relatively cool.

A pair of suitable clutch disks 105, 106 are on opposite sides of the clutch plate 94 and the disks are preferably formed of annular flat rings having suitable composition facing on opposite sides and having teeth 107 at the periphery thereof which mesh with the teeth or splines 43 of the cylindrical member so that the clutch disks rotate with the cylinder 34 and the flywheel 30 and they can move axially. The clutch disks are preferably split so that they are in segments which can be removed and replaced from the sides of the shaft 26 when the cylinder 34 is detached and moved from the flywheel along the shaft 26. Furthermore, the teeth 107 could be omitted and the disks could float.

The clutch disk 105 abuts a flat ring shaped member 110 which is bolted to the side of the flywheel 30 by bolts 111, only one of which appear in the drawings, and the side of the plate 110 facing the flywheel has a series of radial impeller blades 112 formed thereon which causes air to circulate between the flywheel and plate 110 and carry away heat generated by operation of the clutch.

The clutch disk 106 is engaged by the surface 49 of the piston 45 and when the piston is actuated by fluid pressure as described hereinbefore, the force of the piston causing the clutch disks 105, 106 to frictionally grip the clutch plate 94 and thereby drive the shaft 26.

Preferably, a fluid pressure released brake B is provided to brake the drive shaft 26 when the clutch C is disengaged. A brake of any suitable construction may be employed, and in the form shown it comprises an annular cylinder member 115 concentric with shaft 26 and having an end plate 116. A hub 117 is attached to the shaft 26 and extends into the cylinder member 115 and a brake plate 118, which is preferably similar in construction to the center clutch plate described hereinbefore, is splined to the hub and is adapted to move axially relative to the shaft 26 while rotating therewith. Two annular friction disks 119, 120 are disposed on opposite sides of the brake plate 118 and in the form shown, the disks have teeth about the periphery thereof which mesh with splines 121 formed about the interior of the cylinder member 115 to prevent rotation thereof. The friction disks 119, 120 are preferably split so that the segments thereof could be removed and replaced from the sides of the shaft 26, and if desired, the teeth at the periphery thereof could be omitted and the disks permitted to float. The friction disk 120 is normally pressed against the adjacent face of the brake plate 118 and in turn urges the plate into frictional engagement with friction disk 119 by an annular piston member 122 having a flange 123 which engages the friction disk 120, and the piston is urged against the friction disk by a plurality of springs 124 interposed between the flange 123 of the piston and an annular wall 125 projecting inwardly from the periphery of the cylinder member 115. The piston member 122 is adapted to be moved to the left, as viewed in Fig. 3, and release the brake plate 118 from frictional engagement with the friction disks 119, 120, by air pressure entering the cylinder through a pipe 126 into the area between the piston and the wall 125 of the cylinder member. Preferably, the piston 122 is undercut about the periphery thereof to provide a seat for a ring seal 127 which prevents escape of air from between the piston and cylinder. The inner annular portion of the wall 125 is also undercut to accommodate a ring seal 128 between the web and the central portion of the piston.

The pipe 126 is connected with a treadle operated fluid valve 130 which is accessible to the operator of the press, and the inlet of which is connected by a pipe 131 with a suitable source of fluid pressure, not shown. Normally, the valve 130 is in a position to exhaust pipe 126 to a sump or the atmosphere through port 132, and when the treadle is depressed the valve is operated to connect pipe 126 with the fluid pressure supply through pipe 131.

A pipe 135 is connected at one end to pipe 126 and the opposite end is connected to the end of shaft 26 and with the bore 60 through a suitable rotary seal mechanism 136.

It will be seen that by depressing the treadle of the valve 130, fluid pressure is directed into the clutch C to drivingly connect the flywheel 30 with the shaft 26 and at the same time fluid pressure is directed into the brake B to release the shaft 26. When the treadle valve 130 is released the clutch and brake are exhausted, causing the clutch to disengage the flywheel from the shaft 26 and springs 124 to apply a braking force to the shaft 26 by pressing flange 123 against the friction disk 119, as described.

It will be apparent that the advantages enumerated as well as others have been attained and that there is provided a new and improved press mechanism and fluid operated clutch having reliable non-wearing sealing means which is positive in action and provides low cost construction and maintenance. The sealing means can be conveniently disassembled to permit removal of the cylinder 34 from the flywheel to gain access to the clutch friction disks for replacement, etc.

While the preferred form of the invention has been described in considerable detail, it will be apparent that the invention is not limited to the constructions shown and it is my intention to cover hereby all adaptations, modifications and changes therein which come within the practice of those skilled in the art to which the invention relates and the scope of the appended claims.

Having thus described my invention, I claim:

1. In a press or the like, a shaft, a rotary drive element, fluid operated clutch means to drivingly connect said shaft and element and comprising means connected with said rotary drive element and forming a fluid chamber having an opening in a wall thereof through which said shaft extends, means to direct fluid into said chamber, an annular valve member concentric and rotatable with said shaft, a second annular valve member concentric with said shaft and rotatable with said chamber forming means, said valve members having annular faces concentric with said shaft adapted to engage one another to form a fluid seal, the second mentioned valve member being movable toward and from the other to engage and disengage said faces, means to yieldably urge said valve members from each other, and means to detachably connect the first mentioned annular valve member to said shaft.

2. In a press or the like, a shaft, a rotary drive element, a fluid operated clutch to drivingly connect said shaft and element and comprising means connected to said drive element forming a fluid chamber having an opening in a wall thereof through which said shaft extends, said means being detachable from said drive element and slidable along said shaft, means to direct fluid into said chamber, an annular valve member attachable to said shaft, a second annular valve member concentric with said shaft and rotatable with said chamber forming means, said valve members having annular faces adapted to engage one another to form a fluid seal concentric to said shaft, the second mentioned valve member being movable toward and from the other to engage and disengage said faces, means to yieldably urge said valve members from each other, and means to detachably secure the first mentioned valve member to said shaft.

3. In a press or the like, a shaft, a rotary drive element, a fluid operated clutch to drivingly connect said shaft and element and comprising a cylinder concentric with said shaft and means connected with said drive element and forming a fluid chamber having an opening in one wall thereof through which said shaft extends, means to direct fluid into said chamber, an annular valve member concentric to and rotatable with said shaft, a second annular valve member concentric with said shaft and rotatable with said chamber forming means, said valve members having annular faces concentric with said shaft and adapted to engage one another to form a fluid seal, said second annular valve member being responsive to fluid pressure to move into engagement with the other valve member to engage said faces, spring means normally urging said one valve member from the other, and annular fluid seal means between said second annular valve member and said chamber forming means.

4. In a press or the like, a shaft, a rotary drive element, fluid operated clutch means to drivingly connect said shaft and element and comprising a cylinder concentric with said shaft, a piston reciprocable in said cylinder, said piston and an end wall of said cylinder having axial openings through which said shaft extends, means to direct fluid into said cylinder between said end wall thereof and said piston, two spaced annular sealing members concentric to and rotatable with said shaft and supported thereon so as to effect a fluid-tight seal between the members and the shaft, and two annular sealing members concentric with said shaft, means mounting the last-said two annular sealing members on said piston and cylinder respectively and forming a fluid-tight seal between the piston and cylinder and the sealing member supported thereby, the first two mentioned sealing members having annular faces concentric to said shaft and adapted to be sealingly engaged by annular faces of the second mentioned sealing members respectively to provide two spaced fluid seals concentric to said shaft, two of said sealing members being movable longitudinally of said shaft in response to fluid pressure in said cylinder to cause engagement of said annular faces, and means yieldably urging movable sealing members out of engagement with their corresponding sealing members.

5. In a press or the like, a shaft, a rotary drive element, fluid operated clutch means to drivingly connect said shaft and element and comprising a cylinder concentric with said shaft, a piston reciprocable in said cylinder, said piston and an end wall of said cylinder having axial openings therethrough through which said shaft extends, means to direct fluid into said cylinder between said end wall thereof and said piston, two spaced annular sealing members concentric with said shaft, means connecting said sealing members to said shaft for rotation therewith adjacent to said cylinder and piston respectively, two annular sealing members concentric with but free of said shaft and disposed between the first mentioned two annual sealing members and having annular faces adapted to engage annular faces of the first mentioned sealing members respectively, means connecting said last mentioned two sealing members to said piston and cylinder respectively in fluid-tight relationship therewith and for movement outwardly along said shaft in response to fluid pressure in said cylinder to cause engagement of said annular faces respectively, and means to move said last mentioned two sealing members inwardly along said shaft to disengage said annular faces in response to a decrease in fluid pressure in said cylinder.

6. In a press or the like, a shaft, a rotary drive element, fluid operated clutch means to drivingly connect said shaft and element comprising a cylinder concentric with said shaft, a piston reciprocable in said cylinder, said piston and an end wall of said cylinder having axial openings therethrough through which said shaft extends, two spaced annular valve members concentric to and integral with said shaft, two annular valve members concentric with said shaft and rotatable with said piston and cylinder, the second mentioned two annular valve members being disposed between the first two mentioned valve members and having annular faces adapted to engage annular faces of the first mentioned valve members respectively, said second mentioned valve members being movable apart along said shaft to engage said annular faces respectively, said shaft having a conduit therein for the passage of fluid therethrough, said conduit opening between said last mentioned two annular members to introduce fluid between said last mentioned two members to move the same outwardly relative to one another, and spring means normally urging said last mentioned valve member toward one another.

7. In a press or the like, a shaft, a rotary drive element, fluid operated clutch means to drivingly connect said shaft and element and comprising a cylinder concentric with said shaft, a clutch actuating piston reciprocable in said cylinder, said piston and an end wall of said cylinder having axial openings therethrough through which said shaft extends, means to direct fluid into said cylinder between said end wall thereof and said piston, an annular valve member integral with said shaft and adjacent to the opening through said piston, an annular valve member detachably connected by a fluid tight connection with said shaft adjacent to the opening through said cylinder and wall, the second mentioned annular member being movable along said shaft, means detachably connecting said second mentioned annular member to said shaft, two annular valve members concentric with but free of said shaft and rotatable with said piston and cylinder, the first two mentioned valve members having annular faces adapted to be engaged by annular faces of the second mentioned valve members respectively, the second mentioned two of said valve members being movable from one another longitudinally of said shaft in response to fluid pressure in said cylinder to cause engagement of said annular faces respectively, and spring means normally urging the second mentioned two valve members toward one another.

8. In an apparatus of the character described, a shaft member, a rotatable member rotatably supported on said shaft member and forming a wall of a fluid pressure chamber extending transversely of said shaft member, said shaft member passing through an opening in said wall and being subjected to the fluid pressure in said chamber, a shaft seal for preventing the leakage of fluid from said chamber along said shaft member and through said opening comprising first and second spaced annular sealing elements adjacent to said opening and coaxial with said shaft member, said first sealing element being positioned inwardly with respect to said chamber of said second sealing element and said elements having surfaces adapted to engage each other and prevent the flow of fluid pressure between said elements, first support means connecting said first sealing element to one of said members for rotation therewith and effecting a fluid-tight seal between the first sealing element and the member to which it is connected, second support means connecting said second sealing element to the other of said members for rotation therewith and effecting a fluid-tight seal therebetween, said first support means permitting relative movement between said first element and the member to which it is connected and the fluid pressure in said chamber causing movement of said second element into engagement with said second element to effect a fluid-tight seal between said elements and between said members, and means for yieldably urging said first sealing element to a position spaced from said second sealing element.

9. In an apparatus of the character described, a shaft member, a rotatable member rotatably supported on said shaft member and forming a wall of a fluid pressure chamber coaxial with said shaft member, said wall extending transversely of such shaft and said shaft passing through an opening in said wall and being subjected to fluid pressure in said chamber, a piston in said chamber and operable upon introduction of fluid pressure into said chamber to drivingly interconnect said shaft member and said rotatable member, a shaft seal for preventing the leakage of fluid from said chamber along said shaft member and through said opening comprising first and second spaced annular sealing elements adjacent to said opening and coaxial with said shaft member, said first sealing element being positioned inwardly with respect to said chamber of said second sealing element and said elements having surfaces adapted to engage each other and prevent the flow of fluid between said elements, first support means connecting said first sealing element to one of said members for rotation therewith and effecting a fluid-tight seal between the first sealing element and the member to which it is connected, second support means connecting said second sealing element to the other of said members for rotation therewith and effecting a fluid-tight seal therebetween, said first support means permitting relative movement between said first element and the member to which it is connected and fluid pressure in said chamber causing movement of said element into engagement with said second element to effect a fluid-tight seal between said elements and between said members, means for yieldably urging said first sealing element to a position spaced from said second sealing element, and means for introducing fluid pressure into said chamber.

10. In an apparatus of the character described, a first member defining a wall of a pressure chamber and having an opening through said wall, a second member defining another wall of said pressure chamber and having an opening therethrough aligned with the first said opening, a shaft extending through said openings and subject to pressure in said chamber, means for supplying fluid pressure to said chamber, first and second sealing elements concentric with said shaft adjacent to the openings in said first and second members respectively, each of said first and second members carrying a sealing element spaced from the first-mentioned sealing element adjacent to the member and having a surface adapted to engage the first-mentioned sealing element adjacent to the member to prevent the passage of fluid therebetween, first means mounting the first-mentioned sealing elements on said shaft in fluid-tight relationship with respect thereto and for rotation therewith, second means mounting the second-mentioned sealing elements on said first and second members respectively in fluid-tight relationship with respect thereto and for rotation therewith, one of said first and second means permitting relative movement of the elements mounted thereby with respect to their supporting members and disposing the movable elements inwardly of the elements with which they cooperate whereby fluid pressure in said chamber causes the movable elements to move into engagement with the other elements, and means for yieldably urging the movable elements to a position spaced from their cooperating elements.

References Cited in the file of this patent

UNITED STATES PATENTS

| | | |
|---|---|---|
| 1,835,877 | Joyce | Dec. 8, 1931 |
| 1,943,029 | McIlvried et al. | Jan. 9, 1934 |
| 2,169,639 | Grote | Aug. 15, 1939 |
| 2,240,741 | Spalding | May 6, 1941 |
| 2,402,052 | Johansen | June 11, 1946 |
| 2,577,858 | Sampson | Dec. 11, 1951 |

FOREIGN PATENTS

| | | |
|---|---|---|
| 564,638 | Great Britain | Oct. 6, 1944 |